United States Patent [19]
May

[11] Patent Number: 5,715,243
[45] Date of Patent: Feb. 3, 1998

[54] INFORMATION SERVICE PROVIDER FOR TRANSMITTING MULTIPLE RATE WIRELESS INFORMATION

[75] Inventor: Gregory J. May, Corvallis, Oreg.

[73] Assignee: Hewlett-Packard Company, Palo Alto, Calif.

[21] Appl. No.: 411,003

[22] Filed: Mar. 27, 1995

[51] Int. Cl.$^6$ .............................. H04J 3/24; H04Q 7/00
[52] U.S. Cl. ................. 370/312; 370/349; 370/465; 340/825.44; 379/56; 455/38.1
[58] Field of Search ............... 379/56; 455/32.1, 455/38.1, 54.1, 57.1; 340/825.44, 825.26, 825.27, 825.52; 370/312, 313, 314, 345, 347, 349, 465, 389, 468, 477

[56] References Cited

U.S. PATENT DOCUMENTS

| | | | |
|---|---|---|---|
| 4,618,860 | 10/1986 | Mori | 340/825.44 |
| 4,642,632 | 2/1987 | Ohyagi et al. | 370/465 |
| 4,918,437 | 4/1990 | Jasinski et al. | 340/825.44 |
| 4,968,966 | 11/1990 | Jasinski et al. | 340/825.44 |
| 5,043,721 | 8/1991 | May | 340/825.44 |
| 5,077,758 | 12/1991 | DeLuca et al. | 375/342 |
| 5,128,934 | 7/1992 | Jasinski | 370/350 |
| 5,181,227 | 1/1993 | DeLuca et al. | 375/342 |
| 5,260,700 | 11/1993 | Merchant et al. | 340/825.44 |
| 5,311,516 | 5/1994 | Kuznicki et al. | 370/349 |
| 5,392,452 | 2/1995 | Davis | 455/38.1 |
| 5,398,021 | 3/1995 | Moore | 340/825.27 |
| 5,493,282 | 2/1996 | Petreye et al. | 340/825.27 |
| 5,507,040 | 4/1996 | Eaton et al. | 455/343 |
| 5,555,446 | 9/1996 | Jasinski | 455/54.2 |

OTHER PUBLICATIONS

The Book Of The CCIR Radiopaging Code No. 1, Radiopaging Code Standards Group, 1986.

*Primary Examiner*—Alpus H. Hsu
*Attorney, Agent, or Firm*—Curtis G. Rose

[57] ABSTRACT

An information service provider is disclosed which transmits wireless information having address data and message data. The information service provider, such as a computer operatively coupled to a transmitter capable of transmitting wireless information, transmits the wireless information to electronic devices such as watch receivers, stand-alone pagers, palmtop computers with receiver cards, pen based personal digital assistants, notebook computers, and the like. The information service provider sets a encoding rate to be an address rate, then transmits the address data of the electronic device(s) for which the message is intended at the address rate. The information service provider then adjusts the encoding rate to be a message rate different than the address rate, where the message rate corresponds to the address. This technique allows the information service provider to transmit, and the electronic device to process, different types of messages at different rates. This would allow, for example, long complex messages, such as news broadcasts, to be transmitted at a slower rate than shorter, less complex messages, such as personal pages and stock quotes, thereby decreasing the transmission errors of the long complex messages to a number capable of being corrected in a manner transparent to the user.

9 Claims, 9 Drawing Sheets

ADDRESS TABLE 80

| ADDRESS | MESSAGE RATE | |
|---|---|---|
| 1531000 | 2 | 85 PERSONAL MESSAGES |
| 1532003 | 3 | 86 STOCK QUOTES |
| 0000004 | 1 | 87 SPORTS SCORES |
| 0000007 | 0 | 88 NEWS HEADLINES |

| ADDRESS | MESSAGE RATE |
|---|---|
| 0000000 | 1 |
| 0000001 | 1 |
| 0000002 | 2 |
| 0000003 | 0 |
| 0000004 | 1 |
| 0000005 | 0 |
| 0000006 | 0 |
| 0000007 | 0 |
| ⋮ | |
| 1531000 | 2 |
| ⋮ | |
| 1532003 | 3 |
| ⋮ | |
| 2097150 | 2 |
| 2097151 | 2 |

INFORMATION SERVICE PROVIDER FOR TRANSMITTING MULTIPLE RATE WIRELESS INFORMATION

CROSS REFERENCE TO RELATED APPLICATIONS

This invention is related to commonly assigned patent application Ser. No. 08/311,465, filed on even date herewith.

FIELD OF THE INVENTION

This invention relates to the electronics circuitry field. More particularly, this invention is an information service provider for transmitting multiple rate wireless information.

BACKGROUND OF THE INVENTION

Simple electronic devices have existed for years that had the capability to receive and decode information sent through the airwaves. Early stand-alone pagers could display a small amount of numeric information on a single line LCD display—most typically, the phone number of the person "paging" the owner of the pager. Later pagers could display short alphanumeric messages, such as the name and number of the person paging the owner of the pager.

U.S. Pat. No. 5,043,721 to May pioneered the concept of the "personal digital assistant" by using a specialized paging device in conjunction with a personal computer in a manner that allowed wireless information to go far beyond simple names and telephone numbers. The -721 May patent showed how wireless information could, among other things, wake up the computer when a message has been received, compare a received phone number with names and numbers stored in the computer to identify the caller, receive an appointment request and automatically search for conflicts, and generally allow for longer and more complex alphanumeric messages to be processed.

The teachings of the -721 May patent have been used by a news and information service called HP StarLink. Subscribers to this service can receive personalized alphanumeric messages on their HP Palmtop PC equipped with an HP StarLink Wireless Receiver Card. In addition, users can subscribe to receive various other forms of information, such as news headlines, sports scores, weather, business news, and stock quotes. HP StarLink subscribers can receive this information while at home or at the office, or even as they travel throughout most of the country.

While this vast increase in the amount and usefulness of wireless information has been wonderful for those who want to know what is going on no matter where they are, it has not been without its problems. One such problem is that today's information service providers that transmit such information, such as HP StarLink, and today's electronic devices that process such information, such as HP Palmtop Computers and HP StarLink Wireless Receiver Cards, are still operating under a protocol that was designed to handle very short simple messages sent to single users (e.g. telephone numbers), not long complex messages broadcast to multiple users (e.g. hourly news headlines). While this protocol can successfully correct a small number of errors that inevitably occur during the transmission of this information in a manner transparent to the user, (through the use of parity checks and other forms of error correction), transmissions that contain more than a small number of errors are garbled and, in some cases, unreadable and irretrievably lost. While these unpleasant events are less likely to happen with short simple messages such as phone numbers, they are much more likely to happen with long complex messages such as news broadcasts. This problem is especially apparent as the speed in which messages are transmitted increases, as has been the case during the last few years. This problem has become a barrier to the widespread acceptance and use of broadcast news and other lengthy information provided by information service providers.

SUMMARY OF THE INVENTION

An information service provider is disclosed which transmits wireless information having address data and message data. The information service provider, such as a computer operatively coupled to a transmitter capable of transmitting wireless information, transmits the wireless information to electronic devices such as watch receivers, stand-alone pagers, palmtop computers with receiver cards, pen based personal digital assistants, notebook computers, and the like. The information service provider sets an encoding rate to be an address rate, then transmits the address data of the electronic device(s) for which the message is intended at the address rate. The information service provider then adjusts the encoding rate to be a message rate different than the address rate, where the message rate corresponds to the address. This technique allows the information service provider to transmit, and the electronic device to process, different types of messages at different rates. This would allow, for example, long complex messages, such as news broadcasts, to be transmitted at a slower rate than shorter, less complex messages, such as personal pages and stock quotes, thereby decreasing the transmission errors of the long complex messages to a number capable of being corrected in a manner transparent to the user.

DESCRIPTION OF THE DRAWINGS

FIG. 4 shows an exemplary address table in the electronic device of the preferred embodiment of the invention.

FIG. 5 shows an exemplary address table in the information service provider of the preferred embodiment of the invention.

DETAILED DESCRIPTION OF THE PREFERRED EMBODIMENT

Figure 1:
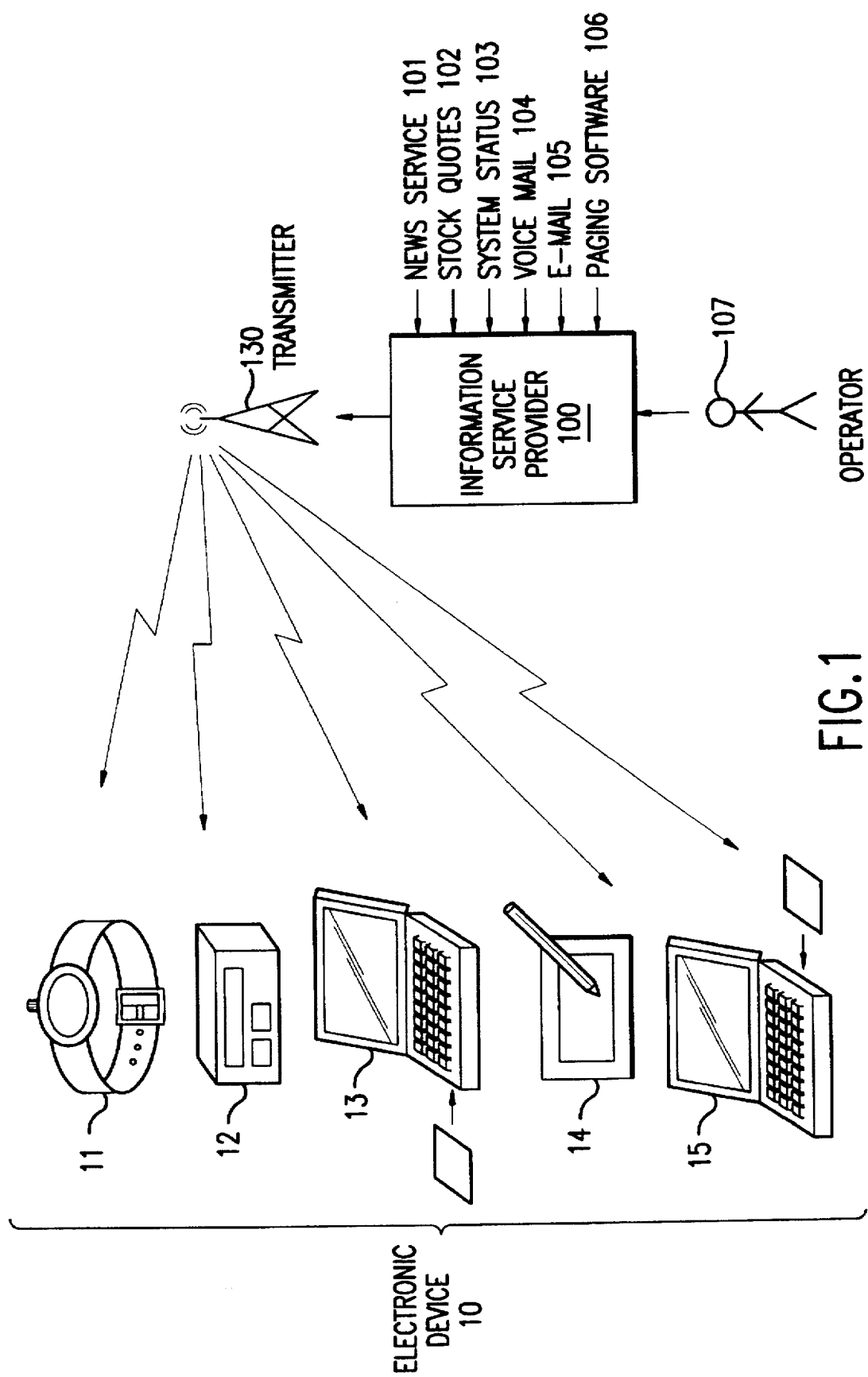
FIG. 1 shows a simplified block diagram of how an information service provider collects information from a variety of sources for transmission to users of various electronic devices in the preferred embodiment of the invention.

FIG. 1 shows a simplified block diagram of how an information service provider collects information from a variety of sources for transmission to users of various electronic devices in the preferred embodiment of the invention. Electronic device 10 can take on a variety of forms, such as watch receiver 11, stand-alone pager 12, palmtop computer with wireless receiver card 13, pen-based personal digital assistant 14, or laptop computer with wireless receiver card 15, and still fall within the spirit and scope of the invention. Each electronic device 10 processes wireless information transmitted by information service provider 100. Information service provider 100 collects information from a variety of sources, such as news service 101, stock quotes 102, system status 103, voice mail 104, electronic mail 105, paging software 106, and operator 107, and transmits it to electronic device 10 via transmitter 130 in a manner that will be described in more detail later. In the preferred embodiment, information service provider 100 is the HP StarLink service, as modified to carry out the invention disclosed herein.

Figure 2:
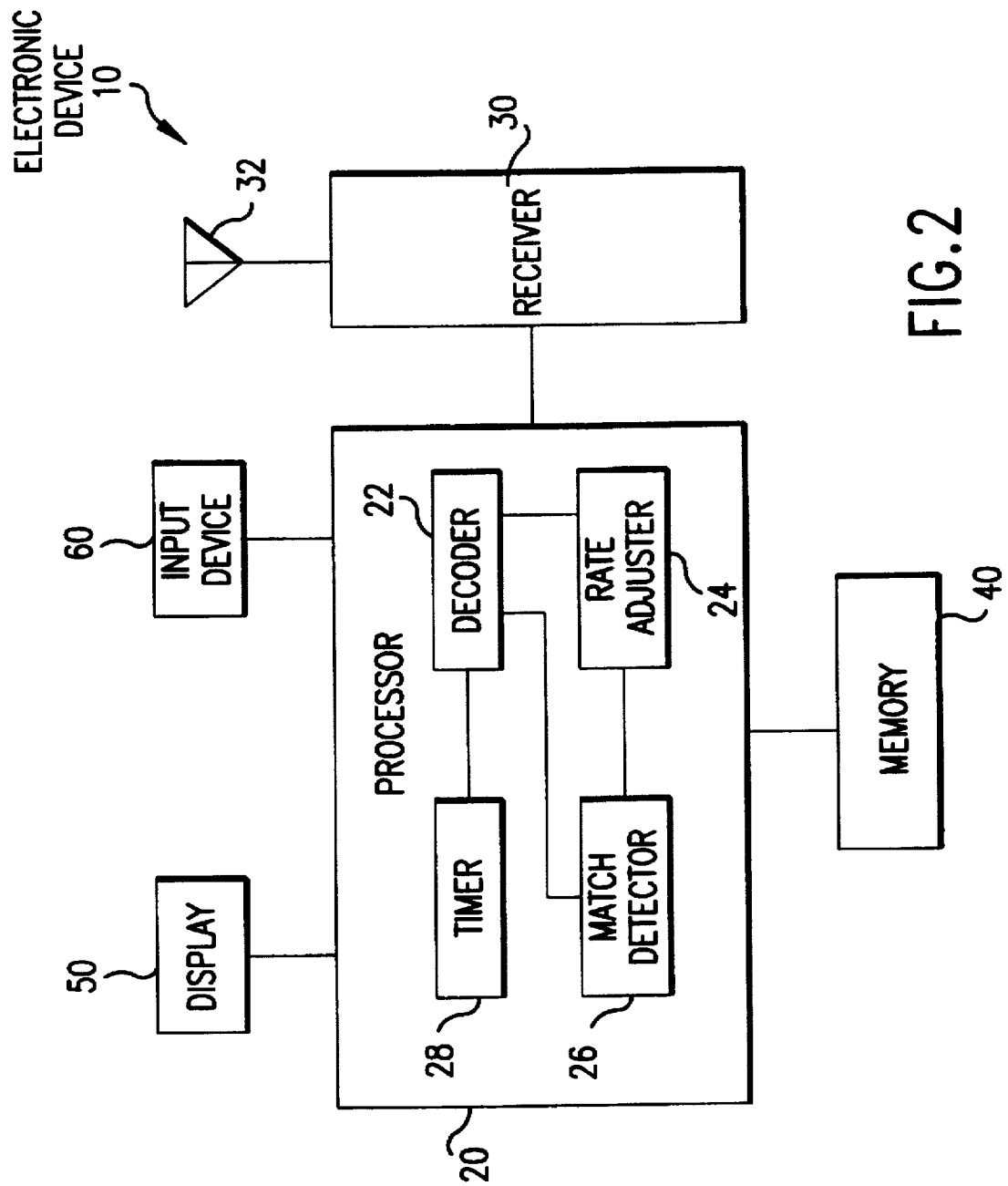
FIG. 2 shows a block diagram of an electronic device of the preferred embodiment of the invention.

FIG. 2 shows a block diagram of electronic device 10 of the preferred embodiment of the invention in more detail. While the block diagram of FIG. 2 is applicable to any of the various electronic devices 11-15, the remainder of the discussion will assume that electronic device 10 is an HP 200LX Palmtop PC and an HP StarLink Wireless Receiver Card, both sold by the Hewlett-Packard Company, as modified to carry out the invention disclosed herein.

Electronic device 10 contains processor 20 connected to receiver 30, memory 40, display 50, and input device 60. Processor 20 is suitably programmed to execute the flowcharts of FIGS. 7-8 of this invention. Processor 20 contains decoder logic unit 22, rate adjuster logic unit 24, match detector logic unit 26, and timer logic unit 28. In the preferred embodiment, the functions of logic units 22-28 are performed by software executing the flowcharts of FIGS. 7-8 of the invention, although specific hardware could be fabricated to perform the function of one or more of these logic units, either within processor 20 or in one or more other hardware integrated circuits or other devices, and still fall within the spirit and scope of the invention. Receiver 30 receives wireless information from information service provider 100 via antenna 32. Memory 40 can be RAM, ROM, PROM, EPROM, hard disk storage, optical storage, any combination of the above, or any other means of storing information, although it is preferred for purposes of this invention that at least a portion of memory 40 be EPROM. In the preferred embodiment, the portion of memory 40 that is EPROM is included in the same physical package and/or can be accessed by processor 20, such that at least some of the contents of the EPROM can be programmed and modified by information service provider 100 via transmitter 130.

Display 50 of electronic device 10 can be small enough to fit on a watch (device 11), large enough for a full size computer screen (device 15), or another size. Input device 60 can be a watch button (device 11), a fully functional keyboard and mouse (device 15), or another input device. In addition, input device 60 can be a display sensitive to the touch of a pen, stylus, finger, or similar instrument, as device 14 shows.

Figure 3:
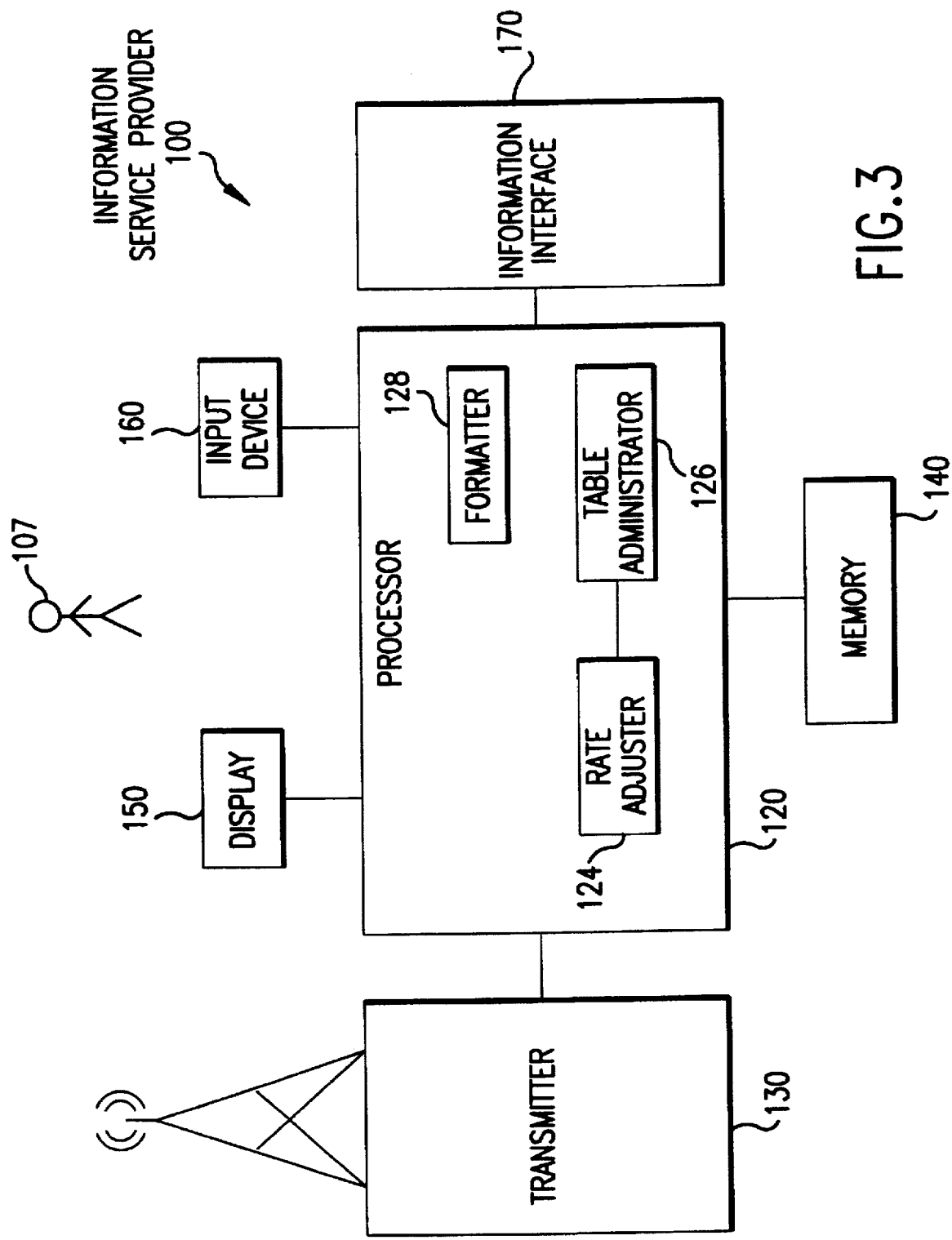
FIG. 3 shows a block diagram of an information service provider of the preferred embodiment of the invention.

FIG. 3 shows a block diagram of information service provider 100 of the preferred embodiment of the invention in more detail. Information service provider 100 contains processor 120 connected to transmitter 130, memory 140, display 150, input device 160, and information interface 170. Processor 120 is suitably programmed to execute the flowcharts of FIGS. 9-10 of this invention. Processor 120 contains rate adjuster logic unit 124, table administrator logic unit 126, and formatter logic unit 128. In the preferred embodiment, the functions of logic units 124-128 are performed by software executing the flowcharts of FIGS. 9-10 of the invention, although specific hardware could be fabricated to perform the function of one or more of these logic units, either within processor 120 or in one or more other hardware integrated circuits or other devices, and still fall within the spirit and scope of the invention. Transmitter 130 transmits wireless information to electronic device 10. Memory 140 can be RAM, ROM, PROM, EPROM, hard disk storage, optical storage, any combination of the above, or any other means of storing information, although it is preferred for purposes of this invention that at least a portion of memory 140 be hard disk storage. Information interface 170 is typically one or more modems connected via one or more telephone lines to a variety of sources, such as Associated Press, Dow Jones News Retrieval Service, etc., as well as to other personal computers equipped with paging software suitable for directly formulating alphanumeric messages. Operator 107 can receive messages via telephone and enter them in to information service provider 100 via input device 160 for transmission to electronic device 10. In addition, operator 107 can screen and compose messages based on raw information coming in via information interface 170.

In the preferred embodiment, processor 120, memory 140, display 150 and input device 160 are all contained in a personal computer, such as an HP Vectra computer. An alternate embodiment has been contemplated where information service provider 100 contains multiple instances of components 120-160 contained in multiple computers. In this embodiment, it would be preferred that these multiple computers are connected together via a computer network, and that at least a portion of memory 140 be shared among all the computers, so each computer would have access to the same address list.

FIG. 4 shows an exemplary address table stored in memory 40 in electronic device 10 of the preferred embodiment of the invention. In the preferred embodiment, address table 80 contains addresses 81-84. Addresses 81-84 are the addresses of electronic device 10. While four addresses are shown in address table 80, those skilled in the art will appreciate that anywhere from one to dozens of addresses could be shown in address table 80 and still fall within the spirit and scope of the invention. In the preferred embodiment, address 81 is a unique address that identifies personal messages intended for the owner of electronic device 10. Likewise, address 82 identifies specific stock quotes requested by the owner of electronic device 10. For example, the owner of electronic device 10 may have requested to be notified with hourly stock quotes for IBM whenever IBM stock falls more than three dollars per share in any one day. Address 83 identifies sports scores that are broadcast to multiple users who subscribe to this service. Unlike addresses 81 and 82, address 83 is not unique to electronic device 10, but is common to all subscribers requesting this service. Address 84 identifies news headlines that, like the sports scores of address 83, are broadcast to multiple users who subscribe to this service and is a non-unique address. While both addresses 83 and 84 are preferably non-unique, they could be unique, but this would require information service provider 100 to transmit the same broadcast message multiple times (taking up valuable airtime), or that some other complex approach be used.

Each address 81-84 has a corresponding message rate 85-88 contained in address table 80. Message rates 85-88 are used by rate adjuster logic 24 of processor 20 to adjust the decoding rate of decoder logic 22 for the message sent to address 81-84, respectively. In the example shown in FIG. 4, messages associated with address 81 are decoded at message rate "two", as message rate 85 shows. Likewise, messages associated with address 82 are decoded at message rate "three", messages associated with address 83 are decoded at message rate "one", and messages associated with address 84 are decoded at message rate "zero", as message rates 86–88 show. In the preferred embodiment, message rate "two" is 2400 baud, message rate "three" is 4800 baud, message rate "one" is 1200 baud, and message rate "zero" is 512 baud, although other rates could be used. In general, slower message rates are selected for lengthy information broadcast to a wide variety of users. This permits these messages to be transmitted more reliably with fewer transmission errors, yet does not unduly hog transmission resources since slow, long messages are normally only sent once to many subscribers in a single transmission. Likewise, short, unique messages, such as stock quotes, are processed at higher message rates, since these messages are unlikely to have more transmission errors than can be fixed transparently to the user, and since a large number of these unique messages must be sent on a regular basis without hogging transmission resources. Longer unique messages and shorter broadcast messages are processed at medium message rates, and may in some implementations be processed at the same rate as the address rate.

FIG. 5 shows an exemplary address table contained in memory 140 in the information service provider 100 of the preferred embodiment of the invention. Address table 180 is very similar to address table 80 of FIG. 4, but is normally much larger, since it normally contains entries for a plurality of electronic devices—not just one electronic device 10 as is shown in FIG. 4. Like address table 80, address table 180 contains addresses and corresponding message rates. Each address 181–184 has a corresponding message rate 185–188 contained in address table 180. Message rates 185–188 are the same as message rates 85–88 of FIG. 4, and are used by rate adjuster logic 124 of processor 120 to adjust the encoding rate of the message transmitted by transmitter 130 to addresses 81–84, respectively. As discussed above, message rate "two" is 2400 baud, message rate "three" is 4800 baud, message rate "one" is 1200 baud, and message rate "zero" is 512 baud in the preferred embodiment of the invention, although other baud rates could be used.

Figure 6:
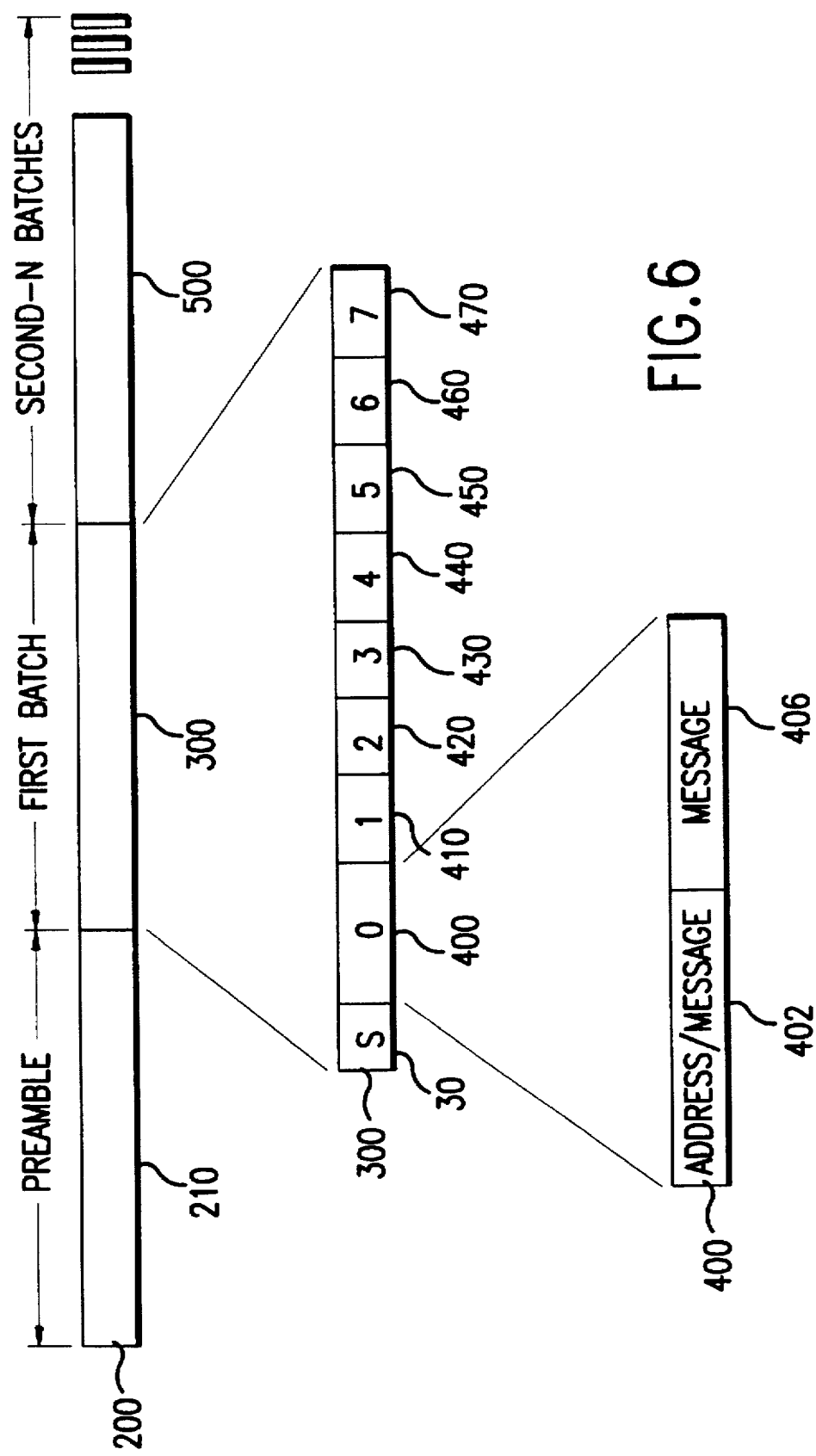
FIG. 6 shows the format by which information is transmitted from the information service provider to the electronic device in the preferred embodiment of the invention.

FIG. 6 shows the format by which information is transmitted from the information service provider to the electronic device in the preferred embodiment of the invention. In the preferred embodiment, this format is known to those skilled in the art as the POCSAG format, as modified as disclosed herein. Those skilled in the art will appreciate that other transmission formats could be used and still fall within the spirit and scope of the invention. More detailed information about the POCSAG format can be found in The Book of The CCIR Radiopaging Code No. 1, published by the Radiopaging Code Standards Group in 1986.

Transmission 200 contains preamble 210, first batch 300, and second through Nth batches 500. First batch 300 contains word synchronization codeword 310 and eight frames 400–470. Frame 400 contains address/message codeword 402 and message codeword 406. Frames 410–470 are similar to frame 400, and second through Nth batches 500 are each similar to first batch 300.

Preamble 210 in the POCSAG format is a series of reversals (101010 . . . ) intended to provide bit synchronization to electronic device 10 when receiver 30 is powered on. Word synchronization codeword 310 is a unique codeword (01111100110100100001010111011000) intended to provide word synchronization to electronic device 10. In POCSAG, messages associated with specific addresses start during specific frames which are also associated with specific addresses. The POCSAG format looks at the least three significant bits of the address to determine on which frame a message associated with that address will appear. For example, referring back to FIG. 4 for a moment, messages associated with address 81 will start on frame 0 (i.e. frame 400), since the three least significant bits of address 81 are 0. Likewise, messages associated with addresses 82, 83, and 84 will start on frames 3, 4, and 7, respectively, since the three least significant bits of addresses 82, 83, and 84 are 3, 4, and 7, respectively.

Address/message codeword 402 can contain either address data or message data. In the POCSAG format, address data is uniquely identified by a zero in the first most significant bit position, although other techniques could be used. If message data included in the previous frame needs to be continued in this frame, address/message codeword 402 contains continued message data. Message codeword 406 contains message data. In the preferred embodiment, all data contained in message codeword 406 is considered message data, and all data contained in address/message codeword 402 is considered either address data or message data, although some implementations could contain other data besides address or message data in these codewords, or multiple or fractional instances of address or message data in these codewords, and still fall within the spirit and scope of the invention. For example, one implementation could provide duplicate instances of the same message data contained in message codeword 406 with the understanding that the electronic device would only decode one of these instances.

Figure 7:
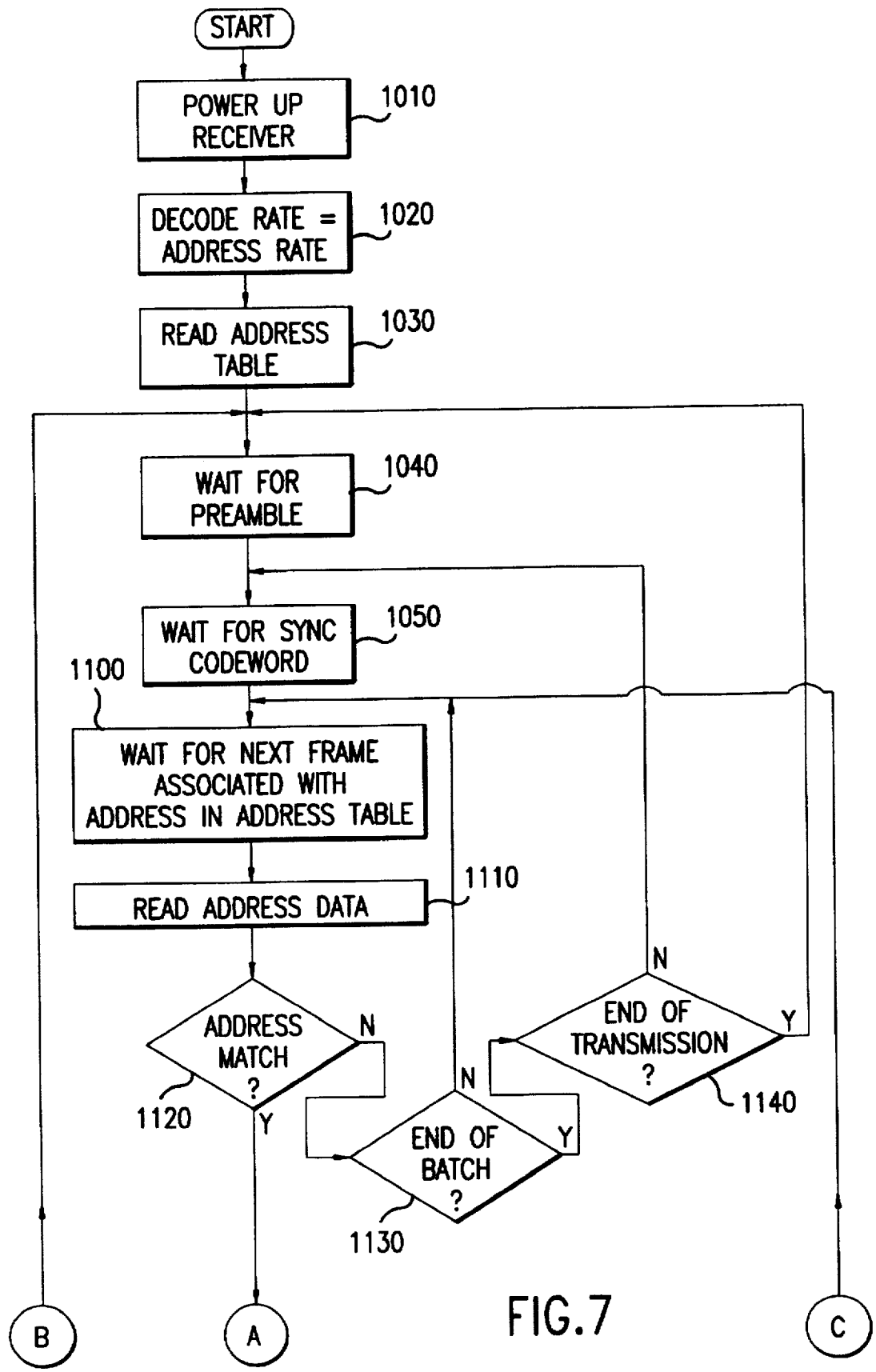
FIGS. 7–8 show a flowchart of the operation of the electronic device of the preferred embodiment of the invention.
Figure 8:
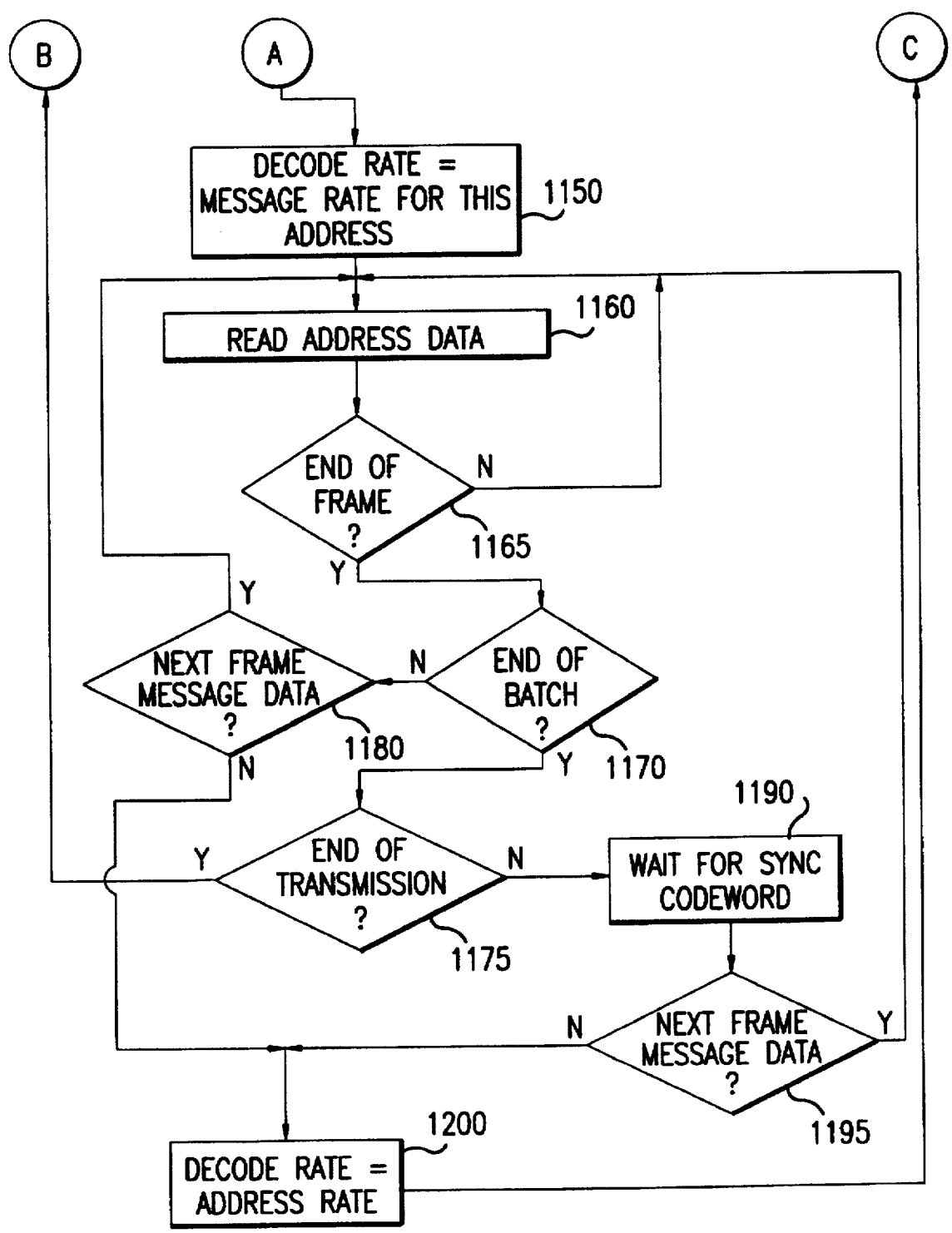

FIGS. 7–8 show a flowchart of the operation of electronic device 10 of the preferred embodiment of the invention. Operation of the flowchart in FIGS. 7–8 will be discussed in conjunction with FIGS. 2, 4 and 6. Block 1010 powers up receiver 30. Block 1020 sets the decode rate to be equal to the address rate. In the preferred embodiment, the address rate is 2400 baud, although other address rates could be used. Note that the address rate is the same rate as message rate "two" used for personal messages. The address rate is normally, but does not have to be, the same as a message rate associated with at least one type of message. Block 1030 then reads addresses 81–84 and message rates 85–88 from address table 80 contained in memory 40 of electronic device 10. Block 1040 then waits until it recognizes preamble 210 in the information received by receiver 30. Once preamble 210 is detected, block 1050 waits for word sync codeword 310.

After synchronization codeword 310 is detected, processor 20 is in word synchronization with the information transmitted in transmission 200. Since processor 20 knows that it cannot start to receive messages during frames not associated with specific addresses, it need not look for address data contained in those frames. For example, since messages associated with addresses 81–84 in address table 80 can only begin in frames 0, 3, 4, and 7, respectively, processor 20 need not look for addresses in frames 1, 2, 5, and 6. Accordingly, block 1100 can, and in the preferred embodiment does, wait for the next frame associated with an address in address table 80. During this wait, block 1100 preferably powers down receiver 30, thereby entering a "sleep state" to conserve battery power.

After the period of time block 1100 waits for the next frame that could have an address in address table 80 elapses, block 1110 reads the data in the address/message codeword in that frame. If the data is address data, and if the address data matches an address contained in address table 80, block 1120 is answered affirmatively, and flow of control moves to block 1150 in FIG. 8. If there is is not a match, this frame either contains message data for another electronic device or an idle codeword (01111010100010011100000110010111 in POCSAG). In either event, block 1130 looks to see if this was the last frame of the batch. If not, flow of control returns to block 1100 to wait for the next frame associated with an address in address table 80. If so, block 1140 checks to see if this was the end of the transmission by seeing if information has stopped being received by receiver 30. If so, control returns to block 1040 to wait for another preamble 210 for a new transmission. If not, a new batch has arrived, and flow returns to block 1050 to wait for a new word synchronization codeword 310.

Referring now to FIG. 8, block 1120 has determined that there is a match between address data in the frame and an address in address table 80. Block 1150 adjusts the decode rate to the message rate for this address. If, for example, address 83 (0000004) was the address matched in block 1120, block 1150 would adjust the decode rate from the address rate (2400 baud) to message rate "one" matched in frame 4 (1200 baud). Likewise, if address 82 was matched, block 1150 would adjust the decode rate to 4800 baud, and if address 84 was matched, block 1150 would adjust the decode rate to 512 baud. Note that if address 81 was detected, block 1150 would still adjust the decode rate from the address rate to message rate "two", but since in our example both of these rates are the same (2400 baud) the execution of block 1150 will have no practical effect.

After block 1150 adjusts the decode rate, block 1160 reads the message data contained in the message codeword in the frame at the newly adjusted decode rate. Block 1160 typically stores the message data in memory 40 for eventual display on display 50.

Block 1165 asks if it is at the end of the frame yet. If not, it loops back to block 1160 to continue to read bits of message data until the time period allotted for the frame has elapsed. Note that even though message data contained in frames 400–470 is transmitted and received at a variety of message rates, each frame is transmitted during the same time interval, so processor 20 of electronic device 10, once synchronized, always knows when the end of frame and end of batch will occur.

If block 1165 is answered affirmatively, block 1170 asks if it is the end of batch yet. If not, block 1180 asks if the address/message codeword in the next frame contains continued message data. This commonly occurs, since most messages are longer than what can fit in a single message codeword in a frame. If so, flow returns back to block 1160 to continue to read message data for this frame. Once block 1180 determines that the next frame does not contained continued message data (i.e. it contains an address), block 1180 is answered negatively. Block 1200 adjusts the decode rate to be the address rate, and flow returns back to block 1100 (FIG. 7) to wait for the next frame associated with an address in address table 80.

If Block 1170 determines that it is at the end of a batch, block 1175 asks if it is also at the end of a transmission. If so, flow moves back to block 1040 (FIG. 7) to wait for a new preamble. If not, a new batch has arrived, and block 1190 waits for a new word synchronization codeword. After the codeword has been processed, block 1195 checks to see if the address/message codeword in the next frame contains continued message data. This commonly occurs, since, as discussed above, most messages are longer than what can fit in a single message codeword in a frame, and since many messages cannot fit in a single batch, especially if it started in a later frame in the batch, such as frame 7. If so, flow returns back to block 1160 to continue to read message data for this frame. If either block 1180 or block 1195 determines that the next frame does not contained continued message data (i.e. it contains an address), both blocks are answered negatively. As discussed previously, block 1200 adjusts the decode rate to be the address rate, and flow returns back to block 1100 (FIG. 7) to wait for the next frame associated with an address in address table 80.

Figure 9:
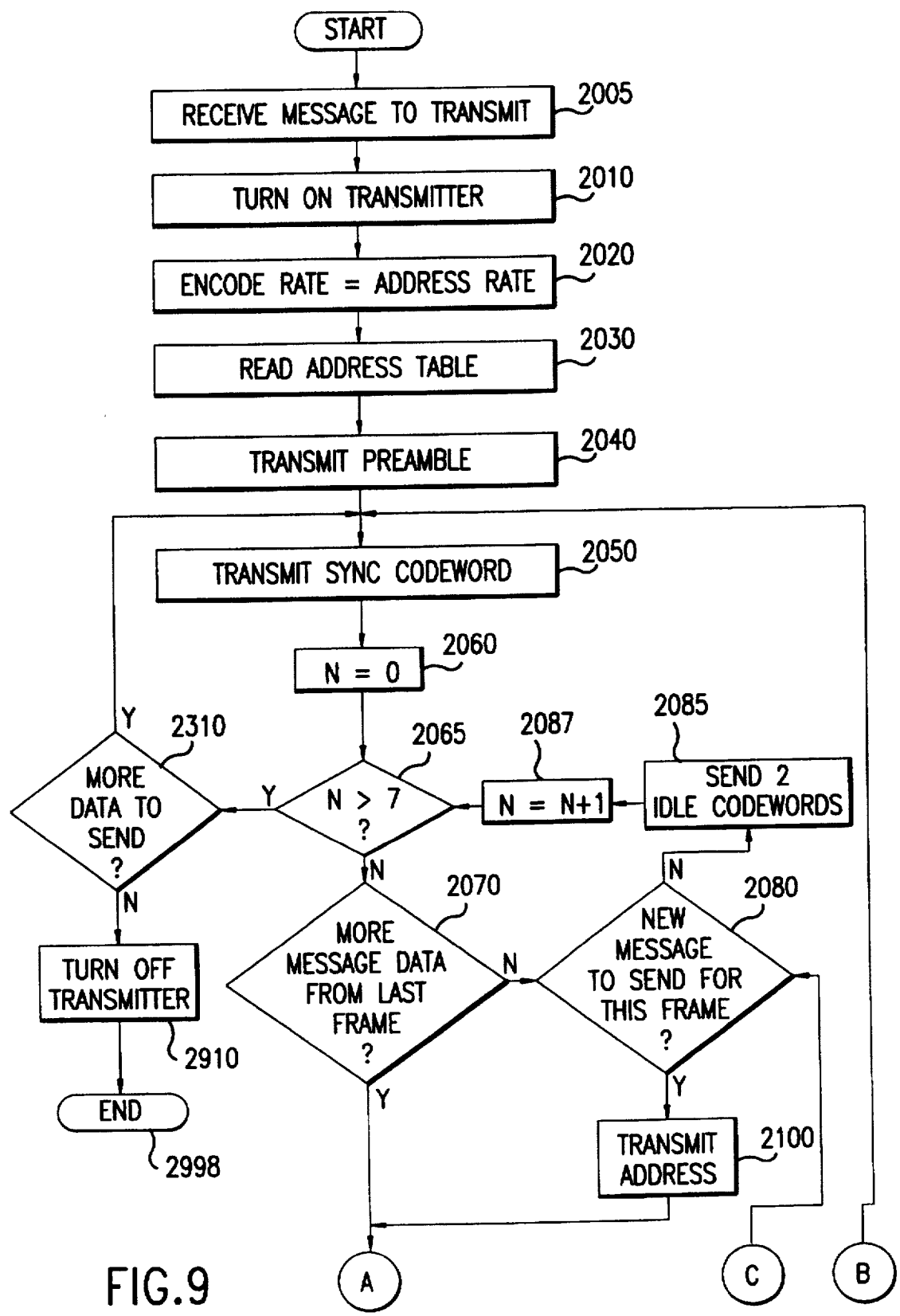
FIGS. 9–10 show a flowchart of the operation of the information service provider of the preferred embodiment of the invention.
Figure 10:
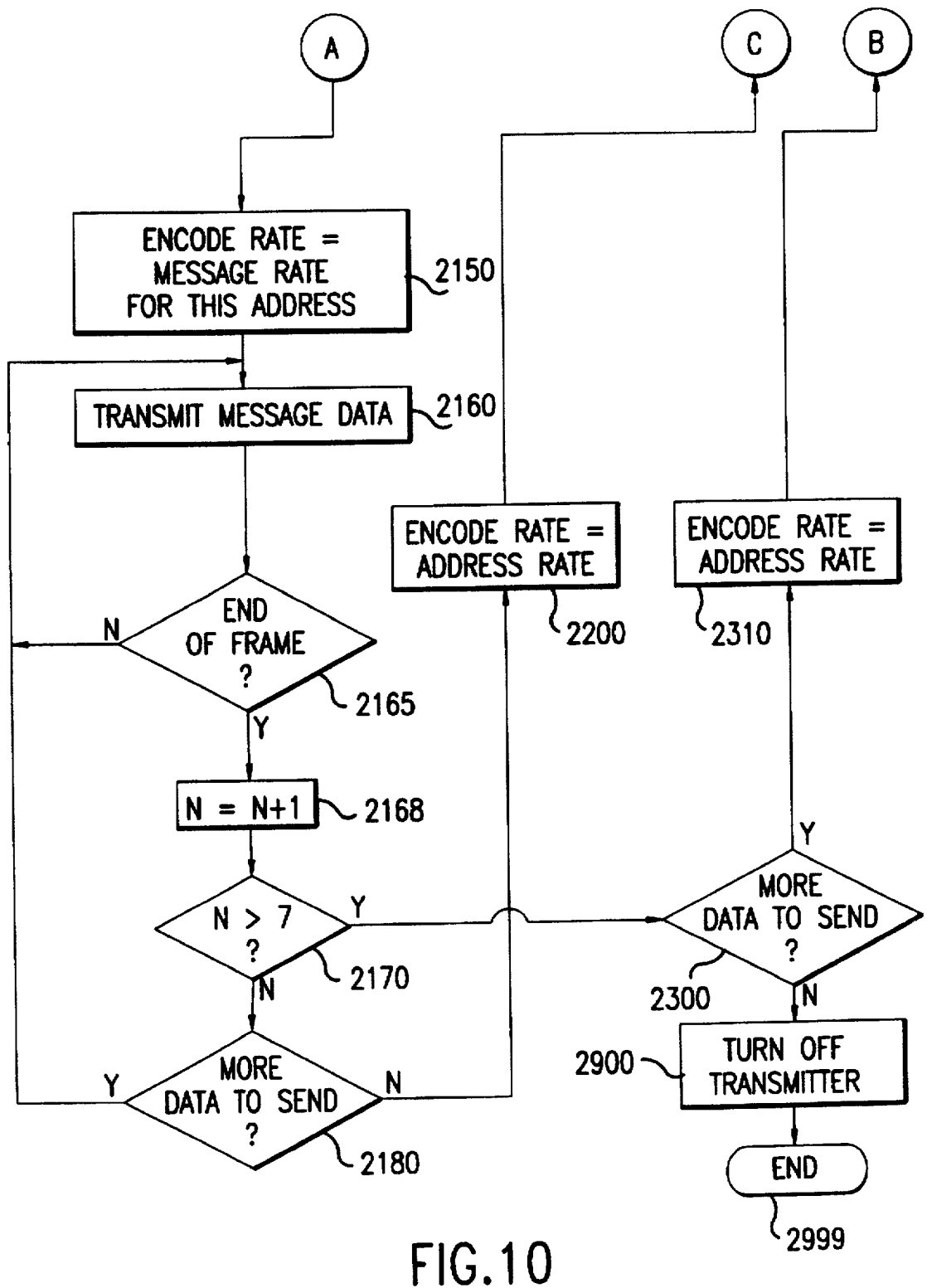

FIGS. 9–10 show a flowchart of the operation of information service provider 100 of the preferred embodiment of the invention. Operation of the flowchart in FIGS. 9–10 will be discussed in conjunction with FIGS. 3, 5, and 6. Block 2005 receives a message to transmit to an electronic device through information interface 170 or input device 160. Block 2010 powers up transmitter 130. Block 2020 sets the encode rate to be equal to the address rate. As discussed previously, the preferred address rate is 2400 baud, although other address rates could be used. Block 2030 then reads address table 180 contained in memory 140 of information service provider 100. Block 2040 then begins a new transmission 200 by transmitting preamble 210. Once preamble 210 is transmitted, block 2050 transmits word sync codeword 310. Block 2060 set frame counter N=0. Block 2065 checks to see if N>7. If not, block 2070 asks if there is continued message data from the last batch (if N=0) or frame (if N is 1 to 7). If not, as would be the case with a new transmission, block 2080 asks if there is a new message to be sent for this frame. As previously discussed, messages associated with addresses are also associated with specific frames. If the message to be sent is not associated with the particular frame indicated by the frame counter N, block 2080 is answered negatively. Block 2085 fills the frame by transmitting two idle codewords. Frame counter N is incremented to the next frame in block 2087, and flow returns back to block 2065.

When block 2080 determines that it has a message to send for this frame, block 2100 transmits the address to which the message to follow will be directed in the address/message codeword of the frame, and flow of control moves to block 2150 of FIG. 10. Block 2150 determines the message rate corresponding to the address data from address table 180 and adjusts the encode rate to the message rate for this address. If, for example, the message to be sent is for address 183 (0000004), block 2150 would adjust the encode rate from the address rate (2400 baud) to message rate "one" (1200 baud). Likewise, if the message is for address 182 was matched, block 2150 would adjust the encode rate to 4800 baud, and if the message is for address 184, block 2150 would adjust the encode rate to 512 baud. Note that if the message was for address 181, block 2150 would still adjust the encode rate from the address rate to message rate "two", but since in our example both of these rates are the same (2400 baud) the execution of block 2150 will have no practical effect.

After block 2150 adjusts the encode rate, block 2160 transmits the message data in the message codeword in the frame at the newly adjusted encode rate. Block 2160 typically retrieves the message data from memory 140 of information service provider 100. Block 2165 asks if it is at the end of the frame yet. If not, it loops back to block 2160 to continue to transmit bits of message data until the time period allotted for the frame has elapsed. As previously discussed, even though message data contained in frames 400–470 is transmitted and received at a variety of message rates, each frame is transmitted during the same time interval, so processor 120 of information service provider 100, always knows when to end the frame and end the batch.

If block 2165 is answered affirmatively, block 2168 increments the frame counter. Block 2170 asks if the requisite number of frames have been transmitting for this batch. If not, the end of the batch has not yet been reached. Block 2180 asks if there is continued message data to send in the address/message codeword in the next frame. As discussed previously, this commonly occurs, since most messages are longer than what can fit in a single message codeword in a frame. If so, flow returns back to block 2160 to continue to transmit message data for this frame. Once block 2180 determines that there is no more message data to transmit for this message, block 2180 is answered negatively. Block 2200 adjusts the encode rate to be the address rate, and flow returns back to block 2080 (FIG. 9) to check to see if a new message is ready to be sent for this frame.

If block 2170 determines that it is at the end of a batch, block 2300 asks if there is more data (either continued message data or a new message) to send. If not, block 2900 turns off transmitter 130, and the program ends in block 2999. If there is more data to send, block 2310 adjusts the encode rate to be the address rate, and flow of control returns to block 2050 to send a new word synchronization codeword. When block 2065 (FIG. 9) detects an end of batch condition, block 2310 asks if there is more data (either continued message data or a new message) to send. If not, block 2910 turns off transmitter 130, and the program ends in block 2998.

What is claimed is:

1. A method in an information service device for transmitting wireless information having first address data and first message data, said method comprising the steps of:

transmitting said first address data at an address rate;

determining that a first message rate slower than said address rate corresponds to said first message data, said first message data comprising lengthy information broadcast to a wide variety of users; and transmitting said first message data at said first message rate.

2. The method of claim 1, wherein said wireless information further comprises second address data and second message data, said method further comprising the steps of:

transmitting said second address data at said address rate;

determining that a second message rate different than said first message rate and said address rate corresponds to said second message data; and transmitting said second message data at said second message rate.

3. The method of claim 1, further comprising the steps of:

formatting said information into a first plurality of frames, a first frame in said first plurality of frames containing said first address data and said first message data, a second frame in said first plurality of frames containing continued first message data; and transmitting said second frame at said first message rate.

4. The method of claim 1, further comprising the steps of:

formatting said information into a first plurality of frames, a first frame in said first plurality of frames containing said first address data and said first message data, a second frame in said first plurality of frames containing second address data and second message data;

transmitting said second address data at said address rate;

determining that a second message rate different than said first message rate and said address rate corresponds to said second message data; and transmitting said second message data at said second message rate.

5. The method of claim 1, further comprising the steps of:

formatting said information into a plurality of batches, a first batch of said plurality of batches containing a first plurality of frames, a first frame in said first plurality of frames containing said first address data and said first message data, a second frame in said first plurality of frames containing continued first message data, a second batch of said plurality of batches containing a second plurality of frames, a first frame in said second plurality of frames containing continued first message data;

transmitting said second frame of said first plurality of frames at said first message rate; and transmitting said first frame of said second plurality of frames at said first message rate.

6. The method of claim 5, further comprising the steps of:

said formatting step including a synchronization codeword in each of said plurality of batches; and transmitting said synchronization codeword at said address rate.

7. An information service provider device comprising a memory and a transmitter for transmitting wireless information having first address data and first message data, said information service provider further comprising:

a rate adjuster for setting an encoding rate to be an address rate;

said transmitter transmitting said first address data at said address rate;

an administrator connected to said rate adjuster and to said memory for determining that a first message rate slower than said address rate corresponds to said first message data, said first message data comprising lengthy information broadcast to a wide variety of users;

said rate adjuster adjusting said encoding rate to said first message rate; and said transmitter transmitting said first message data at said first message rate.

8. The information service provider of claim 7, wherein said wireless information further comprises second address data and second message data, wherein:

said transmitter transmits said second address data at said address rate;

a match detector determines that a second message rate different than said first message rate and said address rate corresponds to said second message data;

said rate adjuster adjusts said encoding rate to said second message rate; and said transmitter transmits said second message data at said second message.

9. A method in an information service provider for transmitting wireless information having first address data and first message data, further comprising the steps of:

formatting said information into a plurality of batches, a first batch of said plurality of batches containing a first plurality of frames, a first frame in said first plurality of frames containing said first address data and said first message data, a second frame in said first plurality of frames containing continued first message data, a third frame in said first plurality of frames containing second address data and second message data, a second batch of said plurality of batches containing a second plurality of frames, a first frame in said second plurality of frames containing continued second message data;

transmitting said first address data at an address rate;

determining that a first message rate slower than said address rate corresponds to said first address data;

transmitting said first message data at said first message rate;

transmitting said continued first message data at said first message rate;

transmitting said second address data at said address rate;

determining that a second message rate different than said first message rate and said address rate corresponds to said second address data;

transmitting said second message data at said second message rate; and transmitting said continued second message data at said second message rate.

* * * * *